United States Patent
Janardanan et al.

(10) Patent No.: US 11,902,166 B2
(45) Date of Patent: Feb. 13, 2024

(54) POLICY BASED ROUTING IN EXTRANET NETWORKS

(71) Applicant: Cisco Technology, Inc., San Jose, CA (US)

(72) Inventors: Raja Janardanan, Milpitas, CA (US); Rajeev Kumar, Sunnyvale, CA (US); Sanjay Kumar Hooda, Pleasanton, CA (US); Prakash C. Jain, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 16/984,924

(22) Filed: Aug. 4, 2020

(65) Prior Publication Data

US 2022/0045956 A1 Feb. 10, 2022

(51) Int. Cl.
*H04L 47/20* (2022.01)
*H04L 12/46* (2006.01)
*H04L 45/745* (2022.01)
*H04L 45/02* (2022.01)

(52) U.S. Cl.
CPC .......... *H04L 47/20* (2013.01); *H04L 12/4641* (2013.01); *H04L 45/02* (2013.01); *H04L 45/745* (2013.01)

(58) Field of Classification Search
CPC ..... H04L 47/20; H04L 12/4641; H04L 45/02; H04L 45/745
USPC .................................. 370/392; 709/238, 242
See application file for complete search history.

(56) References Cited

U.S. PATENT DOCUMENTS

| | | | | |
|---|---|---|---|---|
| 7,212,531 B1* | 5/2007 | Kopelman | ............... | H04L 45/00 370/392 |
| 7,373,660 B1* | 5/2008 | Guichard | ................ | H04L 47/10 726/15 |
| 7,848,335 B1* | 12/2010 | Kang | .................. | H04L 12/4633 370/401 |
| 8,175,107 B1* | 5/2012 | Yalagandula | ........... | H04L 45/66 370/408 |
| 9,860,169 B1* | 1/2018 | Ninan | ...................... | H04L 12/56 |
| 10,491,466 B1* | 11/2019 | Hira | ........................ | H04L 12/66 |
| 2001/0044842 A1* | 11/2001 | Kawakami | ......... | H04Q 11/0478 709/223 |
| 2004/0057440 A1* | 3/2004 | Thubert | ................ | H04W 60/00 370/401 |
| 2004/0196854 A1* | 10/2004 | Thubert | .................. | H04L 45/54 370/395.31 |
| 2004/0223491 A1* | 11/2004 | Levy-Abegnoli | ....... | H04L 61/35 370/389 |

(Continued)

*Primary Examiner* — Madhu Woolcock
(74) *Attorney, Agent, or Firm* — Merchant & Gould P.C.

(57) ABSTRACT

Routing of a traffic in a fabric network may be provided. A first traffic may be received at a first node. It may be determined that the first traffic is coming from a provider virtual network. In response to determining that the first traffic is coming from the provider virtual network, it may be determined that a first subnet associated with the first traffic is associated with a subscriber virtual network. In response to determining that the first subnet associated with the first traffic is associated with the subscriber virtual network, a first virtual network associated with the first traffic may be changed to the subscriber virtual network. A lookup for the first traffic may be changed to a first virtual routing and forwarding of the subscriber virtual network.

20 Claims, 4 Drawing Sheets

(56) References Cited

U.S. PATENT DOCUMENTS

| | | | |
|---|---|---|---|
| 2007/0268885 A1* | 11/2007 | Ford | H04L 45/60 370/428 |
| 2009/0037607 A1* | 2/2009 | Farinacci | H04L 61/103 709/249 |
| 2009/0168788 A1* | 7/2009 | Den | H04L 61/2514 370/401 |
| 2010/0124220 A1* | 5/2010 | Morris | H04L 61/4511 370/389 |
| 2010/0124231 A1* | 5/2010 | Kompella | H04L 61/5061 370/401 |
| 2010/0246545 A1* | 9/2010 | Berzin | H04W 84/005 370/338 |
| 2010/0316035 A1* | 12/2010 | Hirano | H04W 40/24 370/338 |
| 2012/0014386 A1* | 1/2012 | Xiong | H04L 61/103 370/392 |
| 2012/0287932 A1* | 11/2012 | Haddad | H04L 45/04 370/392 |
| 2013/0250947 A1* | 9/2013 | Zheng | H04L 45/02 370/389 |
| 2013/0297824 A1* | 11/2013 | Lan | H04L 45/741 709/238 |
| 2014/0122683 A1* | 5/2014 | Zhao | H04L 41/12 709/223 |
| 2014/0169373 A1* | 6/2014 | Tanimoto | H04L 61/2535 370/392 |
| 2014/0192806 A1* | 7/2014 | Yadav | H04L 45/16 370/390 |
| 2014/0195666 A1* | 7/2014 | Dumitriu | H04L 41/5038 709/223 |
| 2014/0233569 A1* | 8/2014 | Yong | H04L 45/04 370/392 |
| 2015/0003463 A1* | 1/2015 | Li | H04L 12/4641 370/395.53 |
| 2016/0014024 A1* | 1/2016 | You | H04L 45/54 370/389 |
| 2016/0036620 A1* | 2/2016 | Dunbar | H04L 41/12 370/338 |
| 2016/0142310 A1* | 5/2016 | Means | H04L 63/0272 370/392 |
| 2017/0070474 A1* | 3/2017 | Haramaty | H04L 61/103 |
| 2017/0093703 A1* | 3/2017 | Natu | H04L 12/4633 |
| 2017/0195135 A1* | 7/2017 | Singh | H04L 45/745 |
| 2017/0324826 A1* | 11/2017 | Johnsen | H04L 45/24 |
| 2017/0331733 A1* | 11/2017 | Hooda | H04L 12/4633 |
| 2017/0374696 A1* | 12/2017 | Doll | H04L 12/4633 |
| 2018/0123828 A1* | 5/2018 | Zhang | H04L 12/4645 |
| 2018/0159758 A1* | 6/2018 | Waizel | H04L 45/74 |
| 2018/0323891 A1* | 11/2018 | Dubey | H04L 45/02 |
| 2018/0367328 A1* | 12/2018 | Hooda | H04L 61/103 |
| 2019/0132280 A1* | 5/2019 | Meuninck | H04L 12/66 |
| 2019/0140951 A1* | 5/2019 | Hong | H04L 45/7453 |
| 2020/0045012 A1* | 2/2020 | Gopalasetty | H04L 61/2503 |
| 2021/0126812 A1* | 4/2021 | Subramanian | H04L 61/5069 |

\* cited by examiner

POLICY BASED ROUTING IN EXTRANET NETWORKS

TECHNICAL FIELD

The present disclosure relates generally to wire or wireless networks, and in particular to routing traffic in fabric networks.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
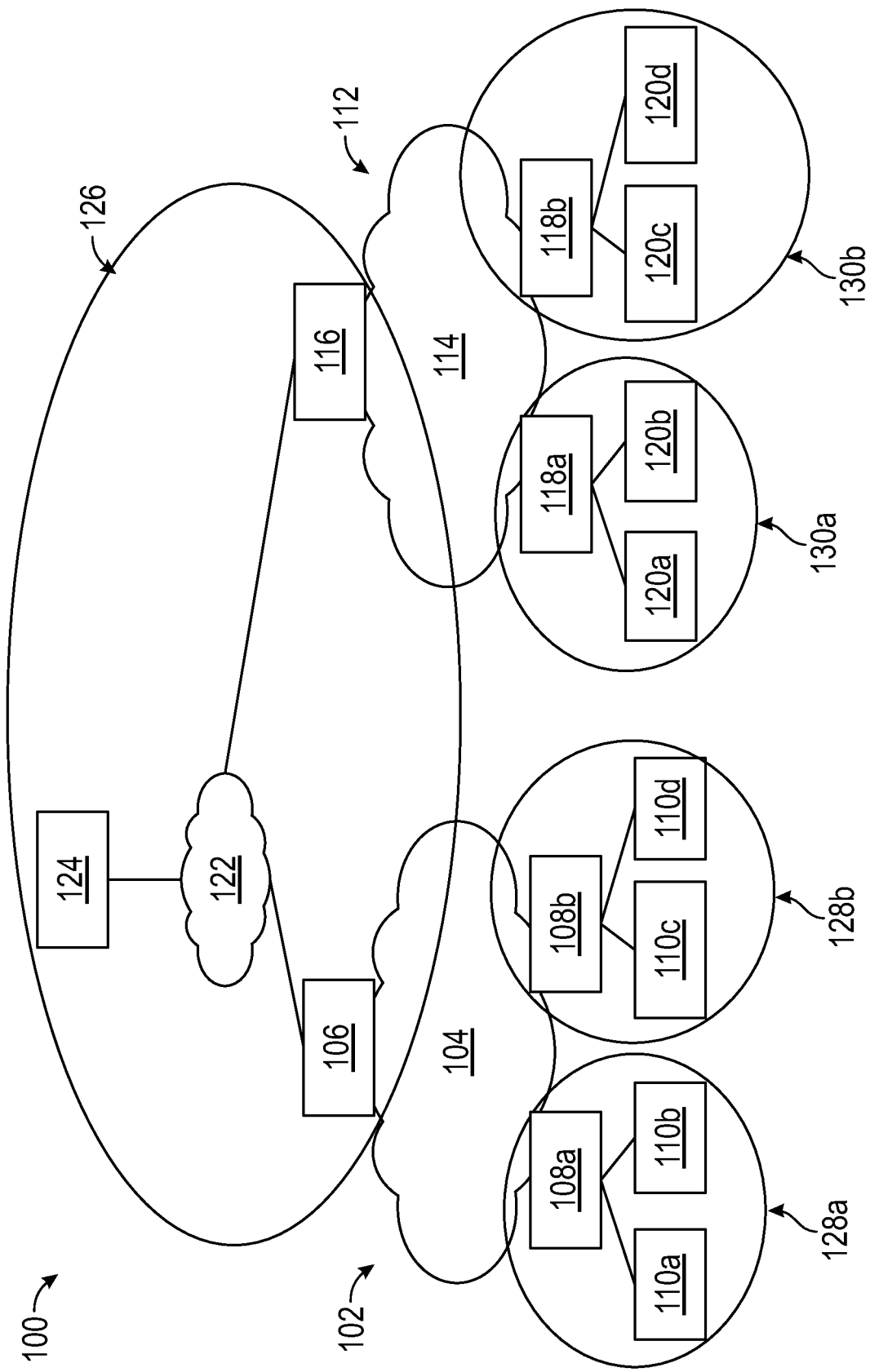
FIG. 1 shows a fabric network environment.

Routing of a traffic in a fabric network may be provided. A first traffic may be received at a first node. It may be determined that the first traffic is coming from a provider virtual network. In response to determining that the first traffic is coming from the provider virtual network, it may be determined that a first subnet associated with the first traffic is associated with a subscriber virtual network. In response to determining that the first subnet associated with the first traffic is associated with the subscriber virtual network, a first virtual network associated with the first traffic may be changed to the subscriber virtual network. A lookup for the first traffic may be changed to a first virtual routing and forwarding of the subscriber virtual network.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes. Fabric networks may comprise overlay and underlay. The underlay may deal with connectivity between fabric network nodes and the overlay may deal with user traffic transiting the fabric network. The fabric network overlay may comprise functional components such as edge nodes, intermediate nodes, border nodes, and a map resolver/server.

In the fabric network overlay, border nodes may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices including hosts) may be attached to the edge nodes. The end points may be in Endpoint Identification (EID) space with each endpoint having an EID. Each device in the fabric network (e.g., the edge nodes and the border nodes) may be configured with an address (e.g., a locator address). The edge nodes may register discovered EIDs (from the end points) with a fabric host-tracking database running on the map resolver/server associating the discovered EID to, for example, the configured locator address of the edge node that discovered it.

When a local edge node receives a packet from a local host destined to a remote host (i.e., on a remote edge node) whose location is not known, the local edge node may send a map request message to the map resolver/server. Once the local edge node receives a reply message back from the map resolver/server associating the unknown EID to the remote locator address, all subsequent traffic from the local host may be encapsulated (e.g., LISP encapsulated) and forwarded to the remote locator address (i.e., remote edge node). Once the encapsulated packet is received on the remote edge node, the remote edge node may decapsulate the packet and forward natively (e.g., to the remote host).

The border nodes may connect the fabric network to the native routing domain. The border nodes may be configured, for example, as LISP PxTR nodes and may provide a default gateway service to the edge nodes. Communication may happen through the border nodes configured, for example, as a LISP PxTR node. When an edge node receives a packet from a local host destined to a host outside the fabric network in the native routing domain, the edge node may encapsulate and send the packet to the border node. The border node may provide, for example, the LISP PxTR functionality and advertise itself as a next-hop address for all the fabric managed EID prefixes to the native routing domain so that it can steer the traffic.

Hosts may comprise overlay devices and may be in different Virtual Routing and Forwarding groups (VRFs) (i.e., subnets) based on function and segmentation requirements. They may be connected to an edge node over a Switched/Bridged Virtual Interface (SVI/BVI) as below:

interface vlan 100
ip vrf forwarding vpn 100
ip address 10.10.100.1 255.255.255.0
interface vlan 200
ip vrf forwarding vpn 100
ip address 10.10.101.1 255.255.255.0

In the above example, the anycast gateway IP addresses are 10.10.100.1 and 10.10.101.1 for Virtual Local Area Networks (VLANs) 100 and 200 respectively. These may be configured on the corresponding SVIs on all the edge nodes. The host IP addresses are in VRF vpn 100, and in the subnets 10.10.100.0/24 and 10.10.101.0/24. The SVI IP addresses may be thought of as the identity of the edge nodes as seen by all hosts in that VLAN.

In various implementations, LISP may specify that all the hosts within the fabric network be registered with all the border nodes. For example, to enable fast traffic convergence and backup path, should the Ternary Content Addressable Memory (TCAM) be depleted on the edge nodes, each border node may support all the hosts within the fabric network. However, this may constrain the upper bound of the size of the fabric network. Accordingly, embodiments of the disclosure may provide a policy based routing and LISP extranet to solve TCAM space depletion issues using inter VRF hop. Processes consistent with embodiments of the disclosure may utilize inter VRF hops to route traffic between the border nodes and the nodes of the fabric network. For example, the following logic may be used consistent with embodiments of the disclosure:

```
If (Extranet) {
    If (VN==Provider_VN) {
        if(subnet == oneof_subscribers_subnets( )) {
            VN = subscriber_VN(subnet)
            set_lookup_vrf = VN
        } else if (VN==Subscriber_VN) {
            if(subnet != oneof_subscribers_subnets( )) {
                VN = Provider_VN
                set_lookup_vrf = VN
            }
        }
    }
}
```

By using the aforementioned logic, the border nodes may not need to maintain a complete list of entries for the hosts. The entries for the hosts may be kept in an incomplete state. However, since the border nodes may initiate an inter VRF hop by using the above logic, any subscriber bound traffic hitting a border node may not trigger a map resolution query either. Rather, the subscriber bound traffic may directly hop to an associated subscriber VLAN based on the above logic. A subscriber VRF may maintain a complete entry of the hosts in its map cache learned from the map-server based on which data traffic may be sent on the overlay to an edge node.

Accordingly, embodiments of the disclosure may provide processes that may optimize entries across virtual networks in provider subscriber relationships thus saving TCAM space, which may be a critical and an important resource in fabric networks. The benefits of processes consistent with embodiments of the disclosure may be further realized in a fabric network where there are multiple provider virtual networks being used. By using these disclosed processes, the TCAM space for the fabric network may be built for the subscriber virtual networks and not be duplicated across multiple provider virtual networks.

FIG. 1 shows a fabric network environment 100 in which embodiments of the disclosure may be practiced consistent with embodiments of the disclosure. Fabric network environment 100 may comprise a plurality of fabric networks, for example, a first fabric network 102 and a second fabric network 112. In examples, first fabric network 102 may be located at a first site and second fabric network 112 may be located at a second site. In such examples, fabric network environment 100 may also be referred to as a multi-site fabric network environment or a split site fabric environment. In some examples, the first site may be at a different geographical location from the second site.

Continuing with FIG. 1, first fabric network 102 may comprise a first plurality of border nodes, for example, a first border node 106. First border node 106 may be coupled to an external network 122. External network 122 may be connected to a server 124. External network 122 may comprises a network outside first fabric network 102. For example, external network 122 may also be referred to as a provider network or a provider virtual network. In other examples, server 124 may be a Dynamic Host Configuration Protocol (DHCP) server or a data center server. External network 122 may comprise, but is not limited to, a data center network.

First border node 106 may connect first fabric network 102 to Layer-3 networks or other fabric networks that may be of the same or different type. For example, first border node 106 may admit, encapsulate/decapsulate, and forward traffic to and from external network 122 connected to first border node 106. In examples, first border node 106 may include a border pair, that is, a pair of servers or routers acting as a single unit. The border pair may include for example, a first device that may route traffic to and from first border node 106 and a second device that may perform control plane functionality. First border node 106 may be associated with a border node identifier.

Continuing with FIG. 1, first fabric network 102 may further include a first plurality of edge nodes, for example, a first edge node 108a and a second edge node 108b. Each of the first plurality of edge nodes of first fabric 102 may be connected to a first plurality of hosts. For example, first edge node 108a may be connected to each of a first host 110a and a second host 110b. Similarly, second edge node 108b may be connected to each of a third host 110c and a fourth host 110d. In examples, the first plurality of hosts of first fabric network 102 may include Layer-2 networks, wireless access points, or endpoint devices. The first plurality of edge nodes of first fabric network 102 may admit, encapsulate/decapsulate, and forward traffic to and from the first plurality of hosts connected to the first plurality of edge nodes. Each of first edge node 108a and second edge node 108b may be associated with an edge node identifier, for example, a Routing Locator (RLOC). In addition, each of first host 110a, second host 110b, third host 110c, fourth host 110d may be associated with a host identifier, for example, an Endpoint Identifier (EID).

First fabric network 102 may further comprise a first network infrastructure 104 that may include one of more interconnected intermediate nodes, for example, switches and routers, that may couple the first plurality of border nodes, for example, first border node 106, to the first plurality of edge nodes, for example, first edge node 108a and second edge node 108b. In examples, the intermediate nodes of first network infrastructure 104 may provide Layer-3 underlay transport service to data traffic in first fabric network 102. Thus, the intermediate nodes may comprise Layer-3 forwarders that may connect first border node 106, first edge node 108a, and second edge node 108b.

First fabric network 102 may be associated with a first plurality of virtual networks, for example, a plurality of provider virtual networks and a first plurality of subscriber virtual networks. For example, and as shown in FIG. 1, first fabric network 102 may include a provider virtual network 126, a first subscriber virtual network 128a, and a second subscriber virtual network 128b. In some examples, provider virtual network 126 may be associated with first border node 106. First subscriber virtual network 128a may be associated with first edge node 108a and may include first host 110a and second host 110b. Second subscriber virtual network 128b may be associated with second edge node 108b and may include third host 110c and fourth host 110d. Each of provider virtual network 126, first subscriber virtual network 128a, and second subscriber virtual network 128b may maintain a VRF for associated routes and devices. In addition, each of provider virtual network 126, first subscriber virtual network 128a, and second subscriber virtual network 128b may be associated with one or more subnets.

Although, each of first edge node 108a and second edge node 108b is shown to be associated with only one subscriber virtual network, that is, first subscriber virtual network 128a and second subscriber virtual networks 128b, each edge node may be associated with more than one subscriber virtual networks. In addition, each of first subscriber virtual network 128a and second subscriber virtual network 128b may be associated with more than one edge node or more than one site.

Second fabric network 112 may include a second plurality of border nodes, for example, a second border node 116. Second border node 116 may also be coupled to external network 122. Second border node 116 may connect second fabric network 112 to Layer-3 networks or other fabric networks that may be of the same or different type. For example, second border node 116 may admit, encapsulate/decapsulate, and forward traffic to and from external network 122 connected to second border node 116. In example embodiments, second border node 116 may also include a border pair, that is, a pair of servers or routers that may act as a single unit. The border pair may include for example, a first device that routes traffic to and from second border node 116 and a second device that may perform control plane functionality. Second border node 116 may be associated with a border node identifier.

Second fabric network 112 may further include a second plurality of edge nodes, for example, a third edge node 118a and a fourth edge node 118b. Each of the second plurality of edge nodes of second fabric network 112 may be connected to a second plurality of hosts. For example, third edge node 118a may be connected to each of a fifth host 120a and a sixth host 120b. Similarly, fourth edge node 118b may be connected to each of a seventh host 120c and an eighth host 120d. In examples, the second plurality of hosts of second fabric network 112 may include Layer-2 networks, wireless access points, or endpoint devices. The second plurality of edge nodes of second fabric network 112 may admit, encapsulate/decapsulate, and forward traffic to and from the second plurality of hosts connected to the second plurality of edge nodes. Each of third edge node 118a and fourth edge node 118b may be associated with an edge node identifier for example, an RLOC. In addition, each of fifth host 120a, sixth host 120b, seventh host 120c, eighth host 120d may be associated with a host identifier, for example, an EID.

Second fabric network 112 may further comprise a second network infrastructure 114 that may include one or more interconnected intermediate nodes, for example, switches and routers, that may couple the second plurality of border nodes, for example, second border node 116, to the second plurality of edge nodes, for example, third edge node 118a and fourth edge node 118b. In examples, the intermediate nodes of second network infrastructure 114 may be Layer-3 forwarders that may connect second border node 116, third edge node 118a, and fourth edge node 118b.

Second fabric network 112 may be associated with a second plurality of virtual networks, for example, a plurality of provider virtual networks and a second plurality of subscriber virtual networks. For example, and as shown in FIG. 1, second fabric network 112 may include provider virtual network 126, a third subscriber virtual network 130a, and a fourth subscriber virtual network 130b. In some examples, provider virtual network 126 may also be associated with second border node 116. Third subscriber virtual network 130a may be associated with third edge node 118a and may include fifth host 120a and sixth host 120b. Fourth subscriber virtual network 130b may be associated with fourth edge node 118b and may include seventh host 120c and eighth host 120d. Each of third subscriber virtual network 130a and fourth subscriber virtual network 130b may maintain a VRF for associated routes and devices. Each of third subscriber virtual network 130a and fourth subscriber virtual network 130b may be associated with one or more subnets.

Although, each of third edge node 118a and fourth edge node 118b is shown to be associated with only one subscriber virtual network, that is, third subscriber virtual network 130a and fourth subscriber virtual networks 130b, each edge node may be associated with more than one subscriber virtual network. In addition, each of third subscriber virtual network 130a and fourth subscriber virtual networks 130b may be associated with more than one edge node or more than one site.

Any of the aforementioned hosts may comprise, but are not limited to, a smartphone, a tablet device, a personal computer, a mobile device, a cellular base station, a telephone, a remote control device, a set-top box, a digital video recorder, a cable modem, a network computer, a mainframe, a router, or other similar microcomputer-based device capable of accessing and using a Wi-Fi network or a cellular network.

The elements described above of fabric network environment 100 (e.g., server 124, first border node 106, first edge node 108a, second edge node 108b, first host 110a, second host 110b, third host 110c, fourth host 110d, second border node 116, third edge node 118a, fourth edge node 118b, fifth host 120a, sixth host 120b, seventh host 120c, and eighth host 120d) may be practiced in hardware and/or in software (including firmware, resident software, micro-code, etc.) or in any other circuits or systems. The elements of fabric network environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of fabric network environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of fabric network environment 100 may be practiced in a computing device 300.

Figure 2A:
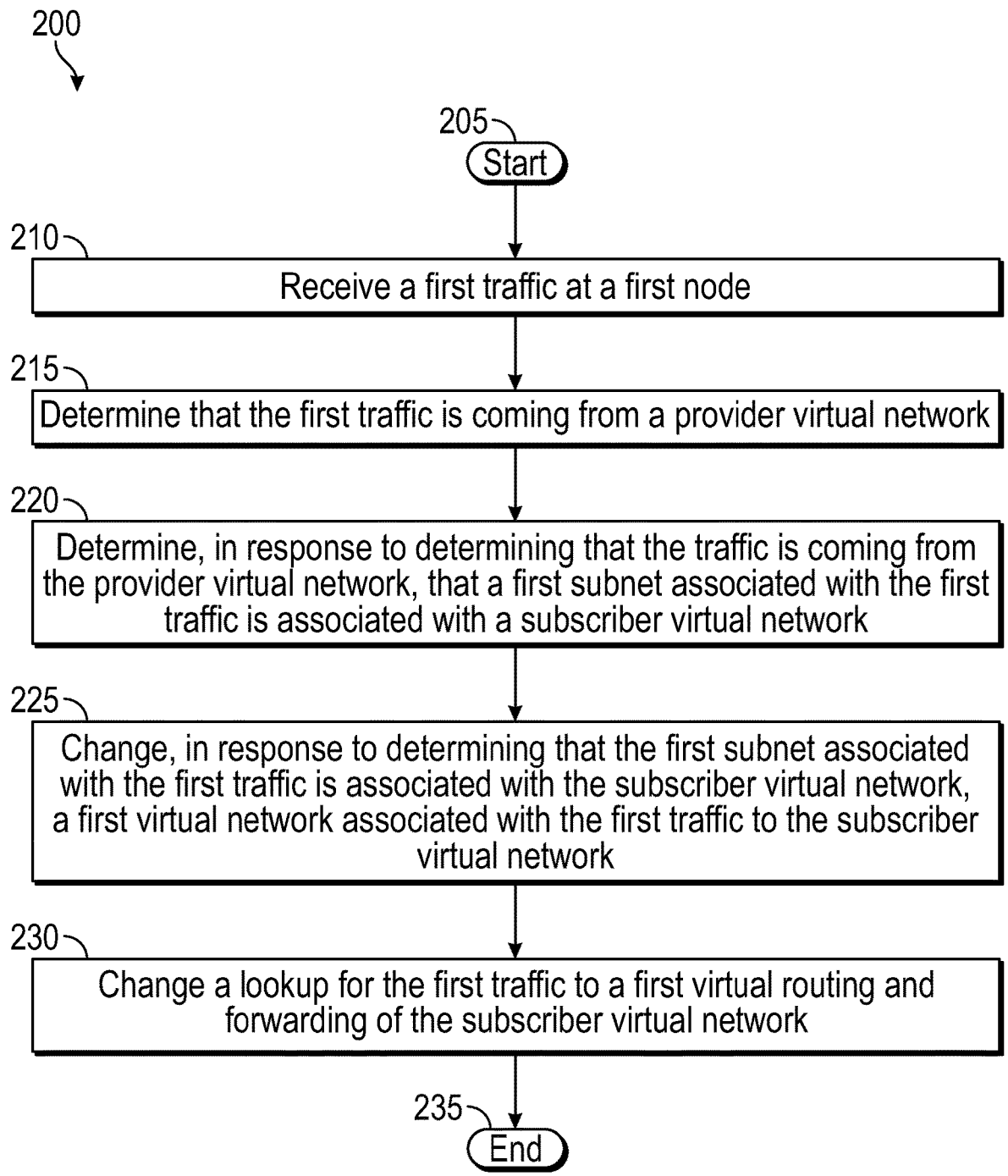
FIG. 2A is a flow chart of a method for routing traffic in a fabric network.

FIG. 2A is a flow chart setting forth the general stages involved in a method 200 consistent with an embodiment of the disclosure for routing data traffic through fabric network environment 100. Method 200 may be implemented using first border node 106 and second border node 116 as described in more detail above with respect to FIG. 1. A computing device 300, as described in more detail below with respect to FIG. 3, may comprise an operating environment for first border node 106 and second border node 116. Ways to implement the stages of method 200 will be described in greater detail below.

Method 200 may begin at starting block 205 and proceed to stage 210 where a first traffic may be received at a first node. For example, a first data traffic may be received at first border node 106 of first fabric network 102 or second border node 116 of second fabric network 112. From stage 210 where the first traffic is received at the first node, method 200 may advance to stage 215 where it may be determined that the first traffic is coming from a provider virtual network. For example, first border node 106 or second border node 116 may determine that the first traffic is conning from provider virtual network 126. In some examples, the first traffic may originate from server 124.

From stage 215 where it is determined that the first traffic is coming from provider virtual network 126, method 200 may advance to stage 220 where it is determined that a first subnet associated with the first traffic is associated with a subscriber virtual network. For example, first border node 106 or second border node 116, in response to determining that the first traffic is coming from provider virtual network 126, may determine that a first subnet associated with the first traffic is associated one of first subscriber virtual network 128a, second subscriber virtual network 128b, third subscriber virtual network 130a, or fourth subscriber virtual network 130b. In some examples, first border node 106 and second border node 116 may include a table of subnets associated with subscriber virtual networks of fabric network environment 100 and may perform a lookup operation in the table to determine a subscriber virtual network corresponding to a subnet.

From stage 220 where it is determined that the first subnet associated with the first traffic is associated with one of first subscriber virtual network 128a, second subscriber virtual network 128b, third subscriber virtual network 130a, or fourth subscriber virtual network 120b, method 200 may advance to stage 225 where a first virtual network associated with the first traffic is changed to the subscriber virtual network. For example, first border node 106 or second border node 116, in response to determining that the first subnet associated with the first traffic is associated with a subscriber virtual network, may change the virtual network associated with the first traffic to a virtual network corresponding to one of first subscriber virtual network 128a, second subscriber virtual network 128b, third subscriber virtual network 130a, or fourth subscriber virtual network 1130b.

From stage 225 where the first virtual network associated with the first traffic is changed to one of first subscriber virtual network 128a, second subscriber virtual network 128b, third subscriber virtual network 130a, or fourth subscriber virtual network 130b, method 200 may advance to stage 230 where a lookup for the first traffic is changed to a first virtual routing and forwarding of the subscriber virtual network. For example, first border node 106 or second border node 116 may change the lookup for the first traffic to a first virtual routing and forwarding of one of first subscriber virtual network 128a, second subscriber virtual network 128b, third subscriber virtual network 130a, or fourth subscriber virtual network 130b. After changing the lookup for the first traffic to the first virtual routing and forwarding of the subscriber virtual network at stage 230, method 200 may end at stage 235.

Figure 2B:
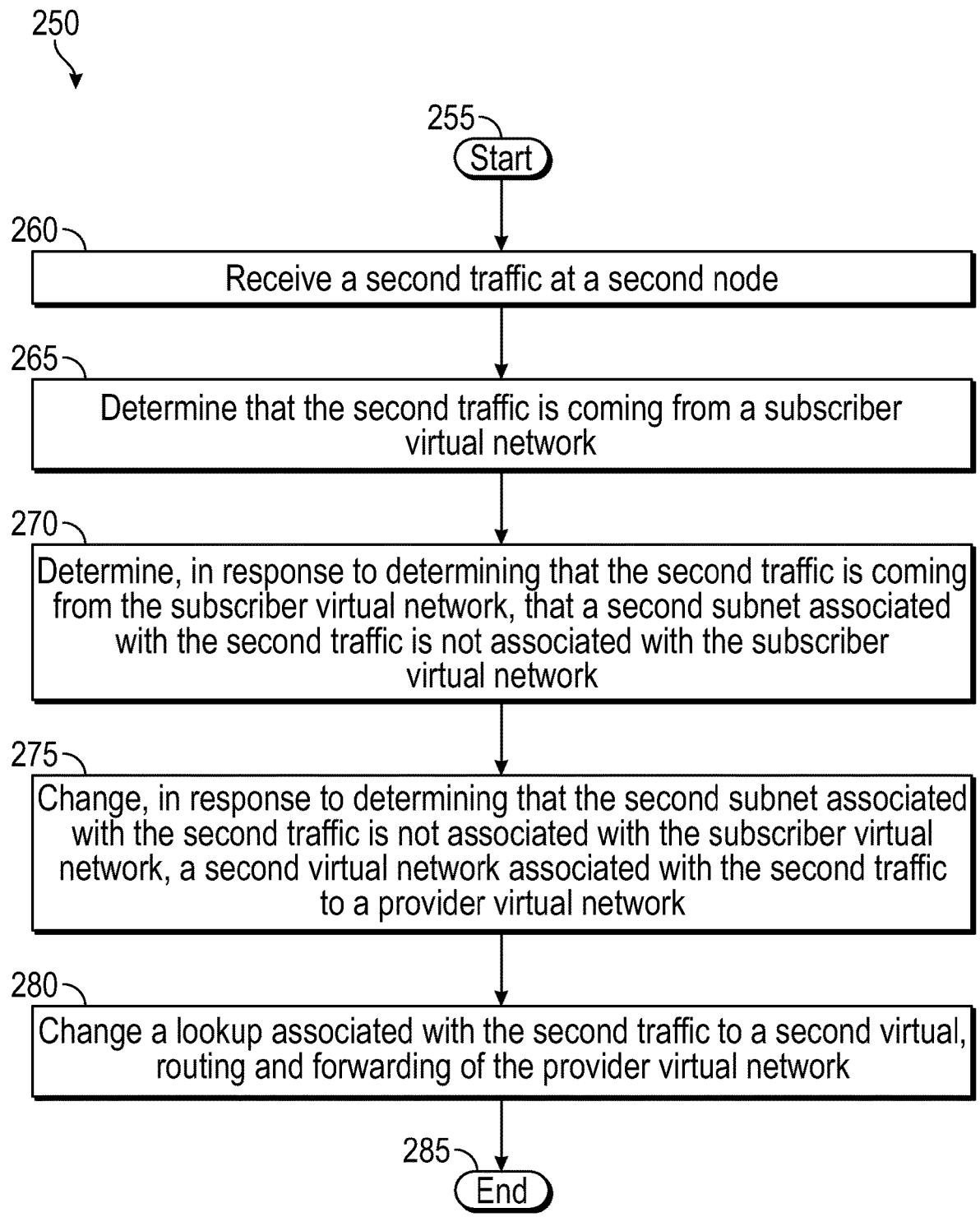
FIG. 2B is a flow chart of another method for routing traffic in a fabric network.

FIG. 2B is a flow chart setting forth the general stages involved in another method 250 consistent with an embodiment of the disclosure for routing data traffic through fabric network environment 100. Method 250 may be implemented using one or more of first edge node 108a, second edge node 108b, third edge node 118a, and fourth edge node 118b as described in more detail below with respect to FIG. 1. Computing device 300, as described in more detail below with respect to FIG. 3, may comprise an operating environment for first edge node 108a, second edge node 108b, third edge node 118a, and fourth edge node 118b. Ways to implement the stages of method 250 will be described in greater detail below.

Method 250 may begin at starting block 255 and proceed to stage 260 where a second traffic may be received at a second node. For example, the second traffic may be received at one of first edge node 108a and second edge node 108b of first fabric network 102 or third edge node 118a and fourth edge node 118b of second fabric network 112. In examples, the second traffic may be received from one of first host 110a, second host 110b, third host 110c, fourth host 110d, fifth host 120a, sixth host 120b, seventh host 120c, and eighth host 120d.

From stage 260 where the second traffic is received at the second node, for example, first edge node 108a, method 250 may advance to stage 265 where it may be determined that the first traffic is coming from a subscriber virtual network. For example, first edge node 108a, which receives the second traffic, may determine that the second traffic is conning from first subscriber virtual network 128a.

From stage 265 where it is determined that the first traffic is coming from the subscriber virtual network, method 250 may advance to stage 270 where it is determined that a second subnet associated with the second traffic is not associated with the subscriber virtual network. For example, first edge node 108a, in response to determining that the second traffic is coming from first subscriber virtual network 128a, may determine that the second subnet associated with the second traffic is not associated first subscriber virtual network 128a. In some examples, first edge 108a may be store a table of subnets associated with first virtual network 128a and perform a lookup operation in the table of subnets to determine that the second subnet associated with the second traffic is not associated with first subscriber virtual network 128a.

From stage 270 where it is determined that the second subnet associated with the second traffic is not associated with first subscriber virtual network 128a, method 250 may advance to stage 275 where a second virtual network associated with the second traffic is changed to the provider virtual network. For example, first edge node 108a, in response to determining that the second subnet associated with the second traffic is not associated with first subscriber virtual network 128a, may change the second virtual network associated with the second traffic to provider virtual network 126.

From stage 275 where the second virtual network associated with the second traffic is changed to provider virtual network 126, method 250 may advance to stage 280 where a lookup for the second traffic is changed to a second virtual routing and forwarding of the provider virtual network. For example, first edge node 108a may change the lookup for the second traffic to the second virtual routing and forwarding of provider virtual network 126. After changing the lookup for the second traffic to the second virtual routing and forwarding of provider virtual network 126 at stage 280, method 250 may end at stage 285.

Figure 3:
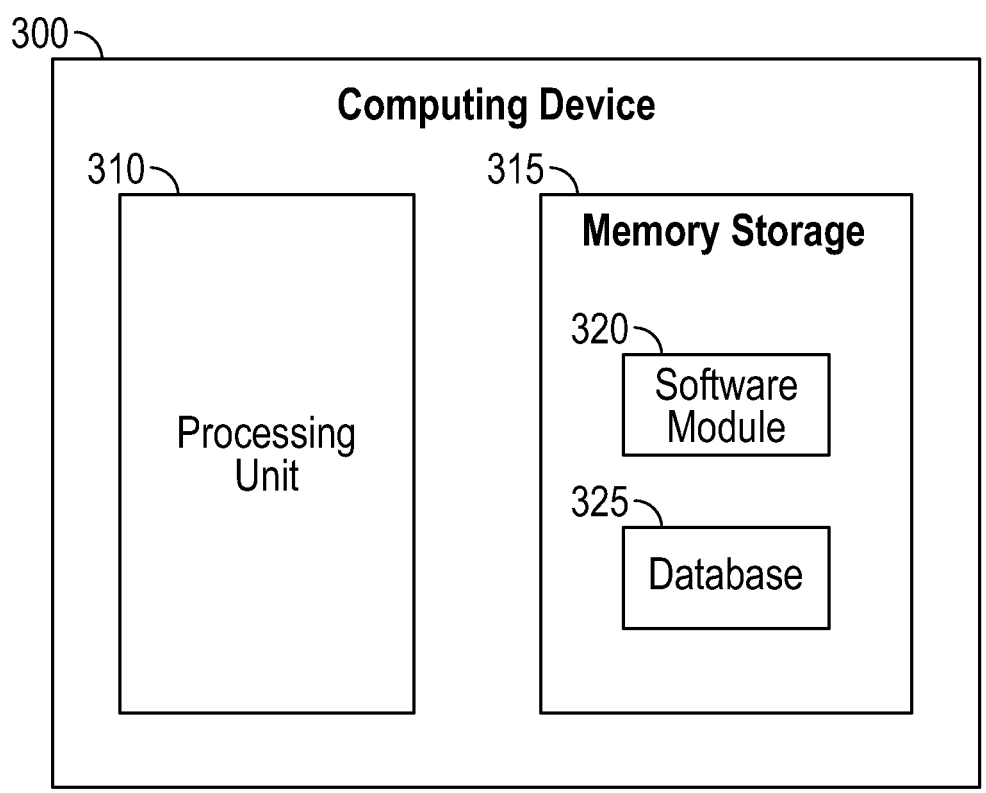
FIG. 3 shows a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for routing network traffic through a fabric network, including for example, any one or more of the stages from method 200 described above with respect to FIG. 2A or method 250 described above with respect to FIG. 2B. Computing device 300, for example, may provide an operating environment for any of server 124, first border node 106, first edge node 108a, second edge node 108b, first host 110a, second host 110b, third host 110c, fourth host 110d, second border node 116, third edge node 118a, fourth edge node 118b, fifth host 120a, sixth host 120b, seventh host 120c, and eighth host 120d. Server 124, first border node 106, first edge node 108a, second edge node 108b, first host 110a, second host 110b, third host 110c, fourth host 110d, second border node 116, third edge node 118a, fourth edge node 118b, fifth host 120a, sixth host 120b, seventh host 120c, and eighth host 120d may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving a first traffic at a first border node connected to a provider virtual network of a fabric network, wherein the fabric network comprises a plurality of virtual subnets interconnected with the provider virtual network by a plurality of intermediate nodes, wherein the plurality of intermediate nodes provide Layer-3 underlay transport service to the first traffic;
determining, by the first border node, that the first traffic is associated with a first virtual subnet of the plurality of virtual subnets and is coming from the provider virtual network;
determining, by the first border node in response to determining that the first traffic is coming from the provider virtual network, that the first virtual subnet associated with the first traffic is associated with a first subscriber virtual network of a plurality of subscriber virtual networks of the fabric network, wherein determining that the first virtual subnet is associated with the first subscriber virtual network comprises:
 performing, at the first border node, a first lookup in a table of subnets, wherein the first lookup is performed based on the first virtual subnet indicated by an IP address of the first traffic, wherein each of a plurality of border nodes of the fabric network comprises the table of subnets having a list of the plurality of virtual subnets associated with the plurality of subscriber virtual networks of the fabric network, and wherein the first border node does not maintain a complete list of addresses of hosts connected to the plurality of subscriber virtual networks of the fabric network, and
 determining, based on the first lookup, that the first virtual subnet is associated with the first subscriber virtual network and a locator address of an edge node connected to the first subscriber virtual network;
changing, by the first border node in response to determining that the first virtual subnet is associated with the first subscriber virtual network, a second lookup address associated with the first traffic based on a first virtual routing and forwarding group of the first subscriber virtual network used by the edge node connected to the first subscriber virtual network for identifying a host of a plurality of hosts connected to the edge node wherein the first virtual routing and forwarding group comprises a complete list of address identifiers for the plurality of hosts connected to the edge node; and
causing, by the first border node, the first traffic to directly hop to the edge node connected to of the first subscriber virtual network.

2. The method of claim 1, wherein causing the first traffic to directly hop to the edge node connected to the first subscriber virtual network comprises forwarding the first traffic to the first subscriber virtual network.

3. The method of claim 1, further comprising receiving the list of the plurality of virtual subnets associated with the plurality of subscriber virtual networks of the fabric network.

4. The method of claim 1, further comprising:
receiving a second traffic at the edge node of the fabric network;
determining that the second traffic is coming from the first subscriber virtual network;
determining, in response to determining that the second traffic is coming from the first subscriber virtual network, that a second virtual subnet associated with the second traffic is not associated with the first subscriber virtual network; and
performing a third lookup for the second traffic to a second virtual routing and forwarding of the provider virtual network.

5. The method of claim 1, wherein the fabric network comprises a split-site fabric network.

6. A non-transitory computer-readable medium that stores a set of instructions which when executed perform a method comprising:
receiving a first traffic at a first border node connected to a provider virtual network of a fabric network, wherein the fabric network comprises a plurality of virtual subnets interconnected with the provider virtual network by a plurality of intermediate nodes, and wherein the plurality of intermediate nodes provide Layer-3 underlay transport service to the first traffic;
determining, by the first border node that the first traffic is associated with a first virtual subnet of the plurality of virtual subnets and is coming from the provider virtual network;
determining, by the first border node in response to determining that the first traffic is coming from the provider virtual network, that the first virtual subnet associated with the first traffic is associated with a first subscriber virtual network of a plurality of subscriber virtual networks of the fabric network, wherein determining that the first virtual subnet is associated with the first subscriber virtual network comprises:
 performing, at the first border node, a first lookup in a table of subnets, wherein the first lookup is performed based on the first virtual subnet indicated by an IP address of the first traffic, wherein each of a plurality of border nodes of the fabric network comprises the table of subnets having a list of the plurality of virtual subnets associated with the plurality of subscriber virtual networks of the fabric network, and wherein the first border node does not maintain a complete list of addresses of hosts connected to the plurality of subscriber virtual networks of the fabric network, and
 determining, based on the first lookup, that the first virtual subnet is associated with the first subscriber virtual network and a locator address of an edge node connected to the first subscriber virtual network;
changing, by the first border node in response to determining that the first virtual subnet is associated with the first subscriber virtual network, a second lookup address associated with the first traffic based on a first virtual routing and forwarding group of the first subscriber virtual network used by the edge node connected to the first subscriber virtual network for identifying a host of a plurality of hosts connected to the edge node wherein the first virtual routing and forwarding group comprises a complete list of address identifiers for the plurality of hosts connected to the edge node; and
causing, by the first border node, the first traffic to directly hop to the edge node connected to of the first subscriber virtual network.

7. The non-transitory computer-readable medium of claim 6, further comprising sending, by the plurality of virtual subnets associated with the plurality of subscriber virtual networks of the fabric network, the list of the plurality of virtual subnets to the first border node.

8. The non-transitory computer-readable medium of claim 6, further comprising:
receiving a second traffic at the edge node of the fabric network;
determining that the second traffic is coming from the first subscriber virtual network;
determining, in response to determining that the second traffic is coming from the first subscriber virtual network, that a second virtual subnet associated with the second traffic is not associated with the first subscriber virtual network; and
performing a third lookup for the second traffic to a second virtual routing and forwarding of the provider virtual network.

9. The non-transitory computer-readable medium of claim 6, further comprising forwarding the first traffic to the host connected to the edge node of the fabric network, the host being associated with the first subscriber virtual network.

10. The non-transitory computer-readable medium of claim 6, wherein the fabric network comprises a split-site fabric network.

11. The non-transitory computer readable medium of claim 6, wherein the first border node provides a default gateway service to the edge node.

12. The non-transitory computer readable medium of claim 6, wherein the plurality of hosts are connected to the edge node over a Switched/Bridged Virtual Interface (SVI/BVI).

13. An apparatus comprising:
a memory storage; and
a processing unit coupled to the memory storage, wherein the processing unit is configured to:
receive a first traffic at a first border node connected to a provider virtual network of a fabric network, wherein the fabric network comprises a plurality of virtual subnets interconnected with the provider virtual network by a plurality of intermediate nodes, wherein the plurality of intermediate nodes provide Layer-3 underlay transport service to the first traffic;
determine that the first traffic is associated with a first virtual subnet of the plurality of virtual subnets and is coming from the provider virtual network of the fabric network;
determine, in response to determining that the first traffic is coming from the provider virtual network, that the first virtual subnet associated with the first traffic is associated with a first subscriber virtual network of a plurality of subscriber virtual networks of the fabric network, wherein the processing unit being configured to determine that the first virtual subnet is associated with the first subscriber virtual network comprises the processing unit being configure to:
perform a first lookup in a table of subnets, wherein the first lookup is performed based on the first virtual subnet indicated by an IP address of the first traffic, wherein each of a plurality of border nodes of the fabric network comprises the table of subnets that comprises a list of the plurality of virtual subnets associated with the plurality of subscriber virtual networks of the fabric network, and wherein the first border node does not maintain a complete list of addresses of hosts connected to the plurality of subscriber virtual networks of the fabric network, and
determine, based on the first lookup, that the first virtual subnet is associated with the first subscriber virtual network and a locator address of an edge node connected to the first subscriber virtual network;
change, in response to determining that the first virtual subnet is associated with the first subscriber virtual network, a second lookup address associated with the first traffic based on a first virtual routing and forwarding group of the first subscriber virtual network used by the edge node connected to the first subscriber virtual network for identifying a host of a plurality of hosts connected to the edge node, wherein the first virtual routing and forwarding group comprises a complete list of address identifiers for the plurality of of hosts connected to the edge node; and
cause the first traffic to directly hop to the edge node connected to of the first subscriber virtual network.

14. The apparatus of claim 13, wherein the processing unit is further configured to:
receive a second traffic at the edge node of the fabric network;
determine that the second traffic is coming from the first subscriber virtual network;
determine, in response to determining that the second traffic is coming from the first subscriber virtual network, that a second virtual subnet associated with the second traffic is not associated with the first subscriber virtual network; and
perform a third lookup for the second traffic to a second virtual routing and forwarding subnets of the provider virtual network.

15. The apparatus of claim 14, wherein the processing unit is further configured to:
forward the second traffic to the first border node of the fabric network, the first border node being associated with the provider virtual network.

16. The apparatus of claim 13, wherein the list of the plurality of virtual subnets associated with the plurality of subscriber virtual networks of the fabric network is received at the first border node.

17. The apparatus of claim 13, wherein the fabric network comprises a split-site fabric network.

18. The apparatus of claim 13, wherein the fabric network comprises a split-site fabric network.

19. The apparatus of claim 13, wherein the first border node provides a default gateway service to the edge node.

20. The apparatus of claim 13, wherein the plurality of hosts are connected to the edge node over a Switched/Bridged Virtual Interface (SVI/BVI).

* * * * *